United States Patent [19]
Burgdorf et al.

[11] Patent Number: 5,383,718
[45] Date of Patent: Jan. 24, 1995

[54] BRAKE SYSTEM WITH A DEVICE FOR CONTROLLING BOTH BRAKE SLIP AND TRACTION SLIP

[75] Inventors: Jochen Burgdorf, Offenbach-Rumpenheim; Hans-Dieter Reinartz, Frankfurt am Main; Helmut Steffes, Hattersheim; Peter Volz, Darmstadt; Erhard Beck, Weilburg; Joachim Maas, Bad Vilbel; Peter Dinkel, Eppstein/Ts.; Stefan Risch, Wiesbaden, all of Germany

[73] Assignee: Alfred Teves GmbH, Germany

[21] Appl. No.: 853,771

[22] PCT Filed: Aug. 26, 1991

[86] PCT No.: PCT/EP91/01620
§ 371 Date: Jun. 5, 1992
§ 102(e) Date: Jun. 5, 1992

[87] PCT Pub. No.: WO92/05990
PCT Pub. Date: Apr. 16, 1992

[30] Foreign Application Priority Data
Oct. 5, 1990 [DE] Germany ............... 4031533
Mar. 18, 1991 [DE] Germany ............... 4108756

[51] Int. Cl.[6] ............... B60T 8/48; B60T 8/42
[52] U.S. Cl. ............... 303/113.2; 303/116.1; 303/119.1; 303/115.4; 303/901; 303/111
[58] Field of Search ............... 303/116.1, 113.2, 113.3, 303/113.1, 116.2, 116.3, 116.4, 119.1, 900, 901, 100, 110, 111, 115.4, 115.1, 115.5; 188/181 R, 181 A

[56] References Cited
U.S. PATENT DOCUMENTS
5,152,586 10/1992 Burgdorf .................. 303/113.2

FOREIGN PATENT DOCUMENTS
282031    9/1988  European Pat. Off. .
3021116  12/1981  Germany .
3439408   7/1986  Germany .
3813145  11/1989  Germany .
3900851   1/1990  Germany .
4001421   7/1991  Germany .
63-297159 12/1988 Japan .
63-301157 12/1988 Japan .

*Primary Examiner*—Douglas C. Butler
*Attorney, Agent, or Firm*—Robert P. Seitter; J. Gordon Lewis

[57] ABSTRACT

A brake system which can be employed both for brake slip control and for traction slip control, wherein the brake slip control is performed according to the return delivery principle, while an open-loop system is set up during traction slip control. In order to manage with the same pump (10) in both cases, a valve system composed of a first non-return valve (16) and a second non-return valve (17) is provided at the suction side of the pump. The opening pressure of the first non-return valve (16) is greater than that of the second non-return valve (17). Further, the initial pressure of a low-pressure accumulator (9) is in excess of the opening pressure of the first non-return valve (16). The first non-return valve (16) is operative during brake slip control, while the second non-return valve (17) is operative during traction slip control. Switch-over can be effected for instance by the master cylinder pressure via a control line (18).

13 Claims, 7 Drawing Sheets

BRAKE SYSTEM WITH A DEVICE FOR CONTROLLING BOTH BRAKE SLIP AND TRACTION SLIP

FIELD OF THE INVENTION

The present invention relates to a brake system arranged to control the pressure in the brake circuit during both a brake slip action and a traction slip action.

BACKGROUND OF THE INVENTION

A brake system of this type is known for instance from German published patent application 30 21 116.

The problems with brake systems of this type can be described as follows:

The basis for the following are anti-lock brake systems operating according to the return delivery principle. Conventionally, brake systems of this type are equipped with a non-self-priming pump, since vacuum must not be formed in the pump as soon as the low-pressure accumulator out of which the pump delivers fluid is exhausted. Also, the wheel brake should not be released excessively, which would result in the brake lining separating from the brake drum or brake disc, respectively. To operate a non-self-priming pump, an initial pressure is required which is generated by the low-pressure accumulator.

When it is desired to use an anti-lock brake system for traction slip control, this system must be capable of filling the wheel brakes to be able to build up a braking pressure which counteracts the drive torque. Therefore, the pump must suck in fluid out of a pressure-fluid supply reservoir. This usually requires a self-priming pump as the pressure-fluid supply reservoir does not provide any initial pressure.

Therefore, two pumps are provided in the brake system according to the above-mentioned publication which perform the various operations. It is clear that the result is a correspondingly complicated auxiliary-pressure supply system.

Admittedly, there are brake systems managing with one pump for both types of control. These brake systems are known as "open-circuit" systems. In this type of system, the pressure fluid which is discharged from the wheel brakes for reducing the wheel braking pressure is led to a supply reservoir, while the pump is constantly taking fluid out of the supply reservoir. The supply reservoir is filled with a sufficient quantity of pressure fluid which is delivered to a controlled circuit, from where a specific quantity of pressure fluid is put aside for the wheel brake as soon as pressure increase becomes necessary. In these systems, there is the risk, however, that braking pressure can no longer be developed in the event of failure of the outlet valve.

Therefore, the present invention is based on the object to provide a brake system which comprises a simple auxiliary-pressure supply system, which conforms to all safety aspects and wherein each brake circuit has only one pump.

In achieving this object, it is of importance that the opening pressure of the first valve is in excess of the atmospheric pressure. This is because once the brake force is discharged completely, the atmospheric pressure of roughly 1 bar prevails in the wheel brake and in the return lline. When the opening pressure of the first valve is in excess of approximately 1 bar, the pump is unable to prime, even if a vacuum is formed in the pump. Thus, the brake linings will not come off the brake drum or the brake disc, respectively.

It is important that the opening pressure of the first non-return valve is less than the initial pressure of the low-pressure accumulator.

When the brake system performs a brake slip control operation, the connecting line leading to the pressure fluid supply reservoir will be closed, and the pump takes in fluid out of the low-pressure accumulator via the first non-return valve.

The closing can be achieved in various manners. One possibility is to arrange for a non-return valve to shut itself. Other possibilities employ a change-over valve which is operated either by the pump pressure or by the master cylinder pressure. An actuation by the pressure in the low-pressure chamber is also possible, as well as by a mechanical actuation by the piston of the low-pressure accumulator.

The construction becomes particularly simple when both non-return valves are connected in series, with a closable connecting line to the pressure fluid supply reservoir branching off between the valves. The closing valve can be combined with the separating valve in a favorable manner.

According to a particular embodiment of the present invention, the brake system requires little space, is easy to assemble and affords low-cost manufacture.

As a result, the housing unit, termed as TSC-adapter hereinbelow, in which non-return valves and the two-way/two-position directional control valve are accommodated can be manufactured to be very compact and can be mounted into a pump unit of an anti-lock brake system. The pump unit operates according to the return delivery principle yet with a self-priming pump, at that location where one single suction valve is arranged if the system performs only an anti-lock function. Preferably, the TSC-adapter is screwed in exactly like the suction valve. An originally existing connection of the pressure line of the pump to the master brake cylinder will be closed or omitted during manufacture.

When a valve block comprising essentially only the inlet and outlet valves is replaced by a valve block which, additionally, comprises the separating valves and which is being built for other brake systems with traction slip control, a low-cost compact brake system with brake slip control and traction slip control is obtained by virtue of only a few innovations.

The present invention shall be explained in more detail in the following by way of nine Figures.

Figure 1:
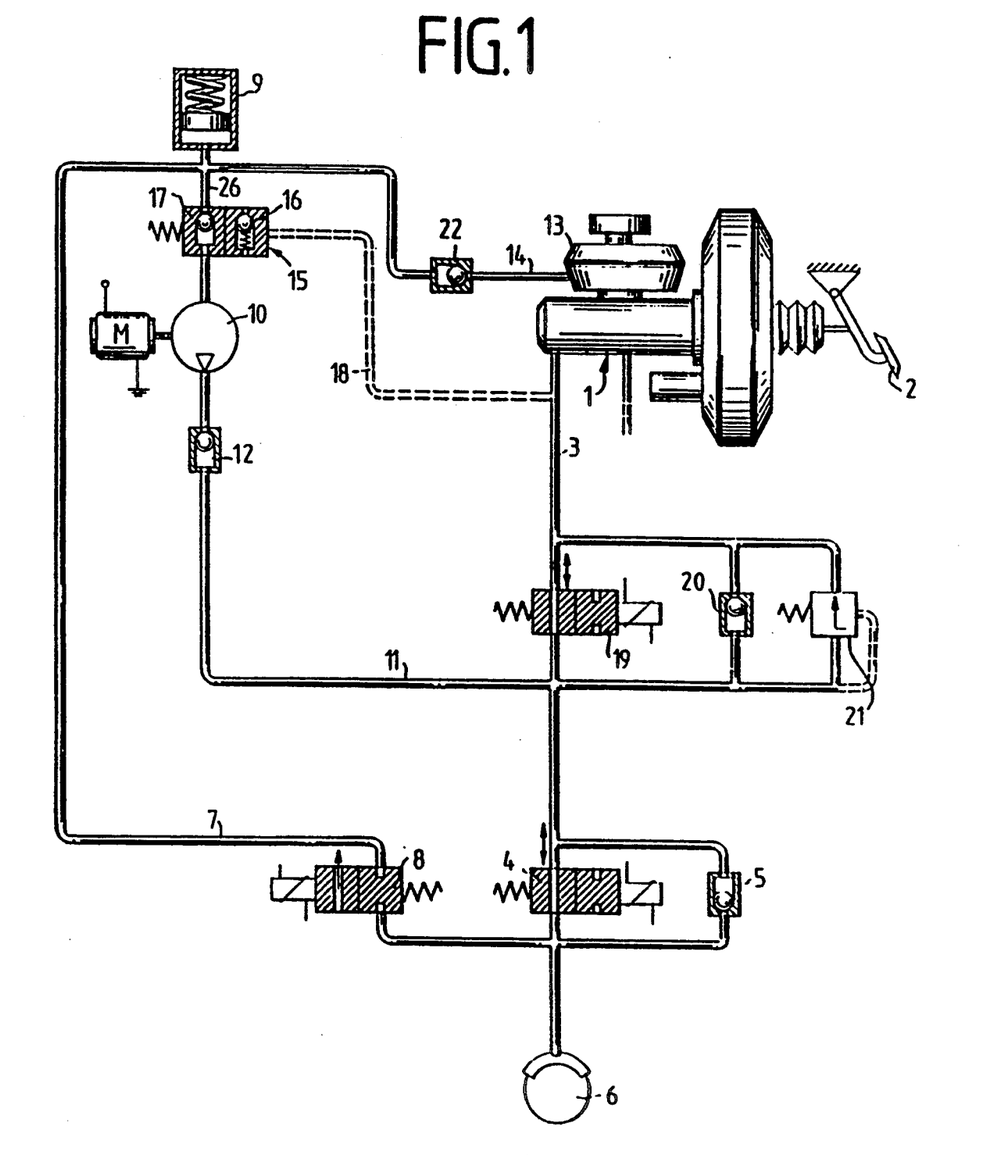
FIG. 1 is a schematic diagram of a first embodiment of the brake system of the present invention.

The brake system is composed of a master brake cylinder 1 which can be subjected to pressure in a known manner by means of a pedal 2. The master brake cylinder 1 is furnished with pressure fluid from a pressure fluid supply reservoir 13 which is in pressure fluid communication with the chambers of the master brake cylinder 1 when the pedal is not applied.

A wheel brake 6 connects to the master brake cylinder 1 through a brake line 3. The wheel brake 6 is associated with a wheel driven by the vehicle engine. Inserted into a brake line 3 is an electromagnetically actuatable inlet valve 4 which keeps the brake line open in its initial position and which closes it in its switch position. This switch position exists when a voltage is applied to the magnet coils. Connected in parallel to the inlet valve 4 is a non-return valve 5 closing towards the wheel brake 6. Further, wheel brake 6 is in communication with a low-pressure accumulator 9 via a return line 7. An outlet valve 8 is inserted into this line and is likewise operated electromagnetically. Outlet valve 8 closes the return line in its initial position. When a voltage is applied to the actuating coils, the outlet valve will release the return line.

The low-pressure accumulator 9 is composed of a piston confining an accumulator chamber and being slightly biassed by a spring. The absorptive volume of the accumulator is restricted.

A pump 10 delivers fluid via a pressure line 11 into the brake line 3 upstream of the inlet valve 4. Connected downstream of the pump is a non-return pressure valve 12. The pump is a self-priming pump, for instance a reciprocating piston pump, the piston of which is coupled to a drive eccentric or is maintained in constant abutment on the eccentric by means of a spring.

Figure 8:
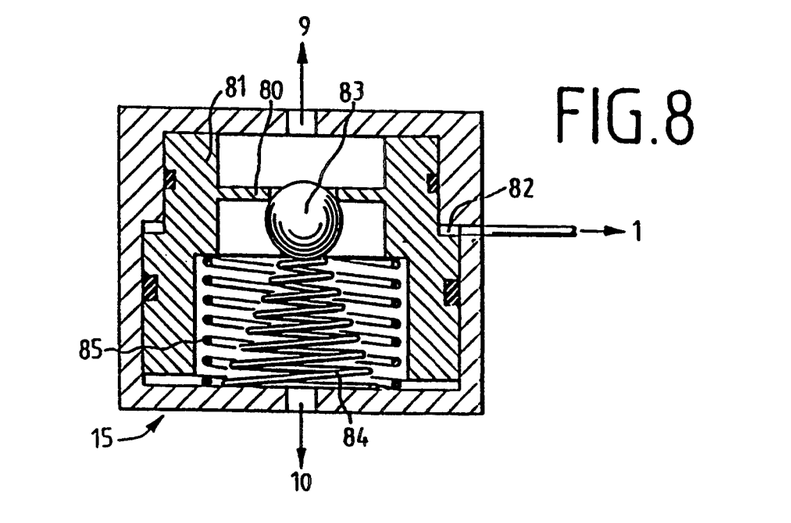
FIG. 8 is a partial cross-sectional view of a switchable suction valve used in the present invention.

The suction side of the pump is in communication with the low-pressure accumulator 9 via a suction line 26. A connecting line 14 connects the pressure fluid supply reservoir 13 with the low-pressure accumulator 9. A non-return valve 22 closing towards the supply reservoir 13 is arranged in this connecting line 14. The suction line 26 is furnished with a switchable suction valve 15 having two switch positions. In the first switch position, a first non-return valve 16 is operative having an opening pressure of approximately 1.5 bar, in any case exceeding the normally occurring atmospheric pressure. In the second switch position a non-return valve 17, having an opening pressure of approximately 0.2 bar, becomes operative. Both non-return valves open in the direction of the pump. A possible embodiment of the valve is illustrated in FIG. 8 and described further below.

Depending on its fill condition, the low-pressure accumulator 9 has an initial pressure ranging between 1.5 and 3 bar. The suction valve 15 is operated via a control line 18. The latter branches off from the master brake cylinder 1. When the control line is unpressurized, the suction valve 15 assumes the second switch position. When the control line is under pressure, the suction valve 15 will switch to assume the first switch position.

Further, the brake line 3 is furnished with a separating valve 19 between the port of the pressure line 11 and the master brake cylinder 1. This separating valve is operated electromagnetically. It keeps the brake line 3 open in its initial position, while it closes the brake line 3 in its switch position. Connected in parallel to the separating valve 19 is a non-return valve 20 closing towards the master brake cylinder 1 and a pressure-relief valve 21.

The brake system operates according to the following pattern:

Upon application of the pedal, a pressure develops in the master brake cylinder 1 which propagates via the open separating valve 19 and the open inlet valve 4 to the wheel brake 6. The wheel braking pressure results in wheel deceleration and hence in vehicle deceleration.

Once it is determined, by means of wheel sensors (not shown), that the wheel tends to lock, the system will switch to the anti-lock mode. To this end, the drive of the pump is switched on, the inlet valve 4 will be closed and the outlet valve 8 will be opened. Pressure already developed in the control line 18 during braking without slip control caused the suction valve 15 to adopt its first switch position. Thus, the first non-return valve 16 with an opening pressure of approximately 1.5 bar is operative in the suction line 26.

Opening of the outlet valve 8 causes discharge of pressure fluid out of the wheel brake 6 via the return line 7 into the low-pressure accumulator 9. A pressure somewhat in excess of 1.5 bar builds up there corresponding to the bias of the spring. The pressure fluid cannot reach the supply reservoir 13 because the non-return valve 22 is closed.

The pressure of the low-pressure accumulator, being in excess of the opening pressure of the first non-return valve 16, becomes effective as initial pressure for the pump 10 so that pressure fluid is sucked in from the low-pressure accumulator and is supplied back into the brake line and, with the separating valve 19 open, respectively, into the master brake cylinder 1.

This pressure fluid can be delivered again from the master brake cylinder 1 into the wheel brake cylinder 6 for renewed pressure build-up in the wheel brake.

Should the low-pressure accumulator 9 be emptied during a brake slip control operation so that no corresponding initial pressure can be built up any more, the pump is unable to take in pressure fluid out of the supply reservoir since the low pressure in the connecting line 14 and, respectively, in the suction line 26 is not sufficient to overcome the opening pressure of the first non-return valve 16.

Thus, no pressure fluid out of the supply reservoir 13 reaches the brake circuit. The system remains closed.

This applies even if the outlet valve 8 fails, that is if it remains in its open position although the coils are not energized any more. The non-return valve 22 prevents displacement of pressure fluid out of the master brake cylinder into the supply reservoir 13 on brake application. Thus, pressure can be built up in the brake circuit even when the outlet valve is defective.

However, as soon as a traction slip control operation becomes necessary, the brake system presents itself as an open-loop system. Braking pressure build-up during a traction slip control operation is effected irrespective of the actuation of the system by the brake pedal 2. The engine torque is counteracted by a brake torque in order to prevent racing of the driven wheel.

Since the brake pedal is not applied, the master cylinder and hence the control line 18 are unpressurized. The suction valve 15 is in its second switch position where the second non-return valve 17 is operative.

When a traction slip control operation starts, first the separating valve 19 is switched over so that a pressure corresponding to the opening pressure of the pressure-relief valve 21 can be adjusted in the pressure line 11. The motor of the pump will be switched on, and pump 10 will now suck in pressure fluid out of the supply reservoir 13 via the second non-return valve 17 and the non-return valve 22. Switching of the inlet and outlet valves 4 and 8 permits varying the pressure in the wheel brake and to adapt it to the respective rotational pattern of the wheel.

Figure 2:
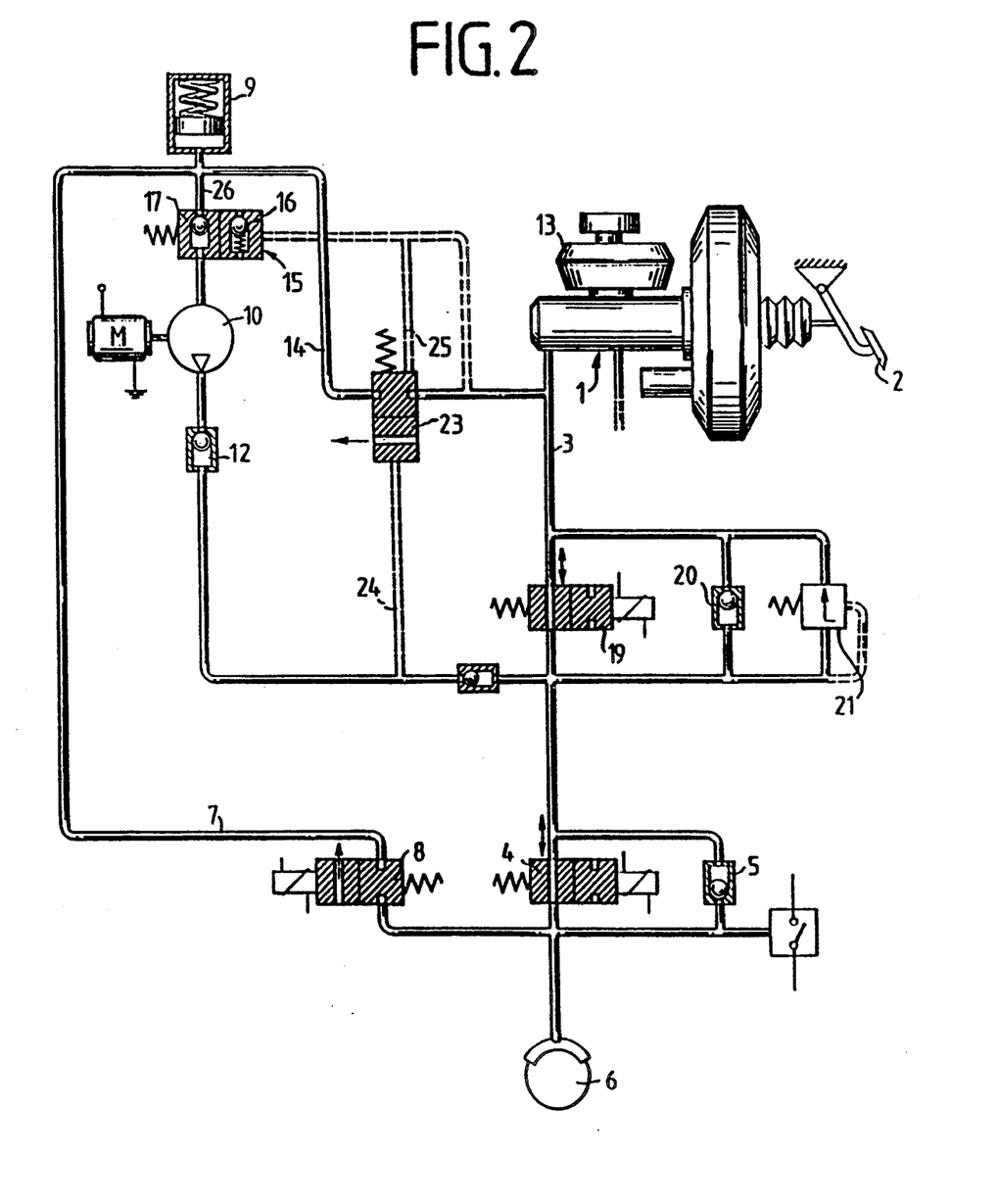
FIG. 2 is a schematic diagram of a second embodiment of the brake system of the present invention.

The embodiment of FIG. 2 differs from FIG. 1 only in that the connecting line 14 does not terminate directly into the supply reservoir 13 but into the brake line directly downstream of the master brake cylinder. In this arrangement, it is not sufficient to separate the line 14 by a non-return valve. Instead, a two-way/two-position directional control valve 23 is provided which closes the line in both directions. This valve is connected to a first control line 24 and a second control line 25. The pump pressure is effective in the first control line 24, while the master cylinder pressure is effective in the second control line. The valve 23 is switched from the closed position to assume the open position only when the pump pressure appreciably exceeds the master cylinder pressure.

Pump pressure does not prevail during a normal braking operation without slip control. The master cylinder pressure keeps the valve 23 in a position where the connecting line 14 is closed.

Both master cylinder pressure and pump pressure prevail during a brake slip control operation. However, these pressures are of approximately equal magnitude so that valve 23 will not be switched over in this case either.

The control line 25 is unpressurized only when a traction slip control operation is initiated, while the control line 24 leads the pump pressure. Valve 23 will be switched over so that the pump may take in fluid out of the supply reservoir 13 via the connecting line 14 and via the master brake cylinder. The connection between the master brake cylinder 1 and the supply reservoir 13 is open.

The mode of operation of this system can be taken from the description of the operation of the system according to FIG. 1.

Figure 3:
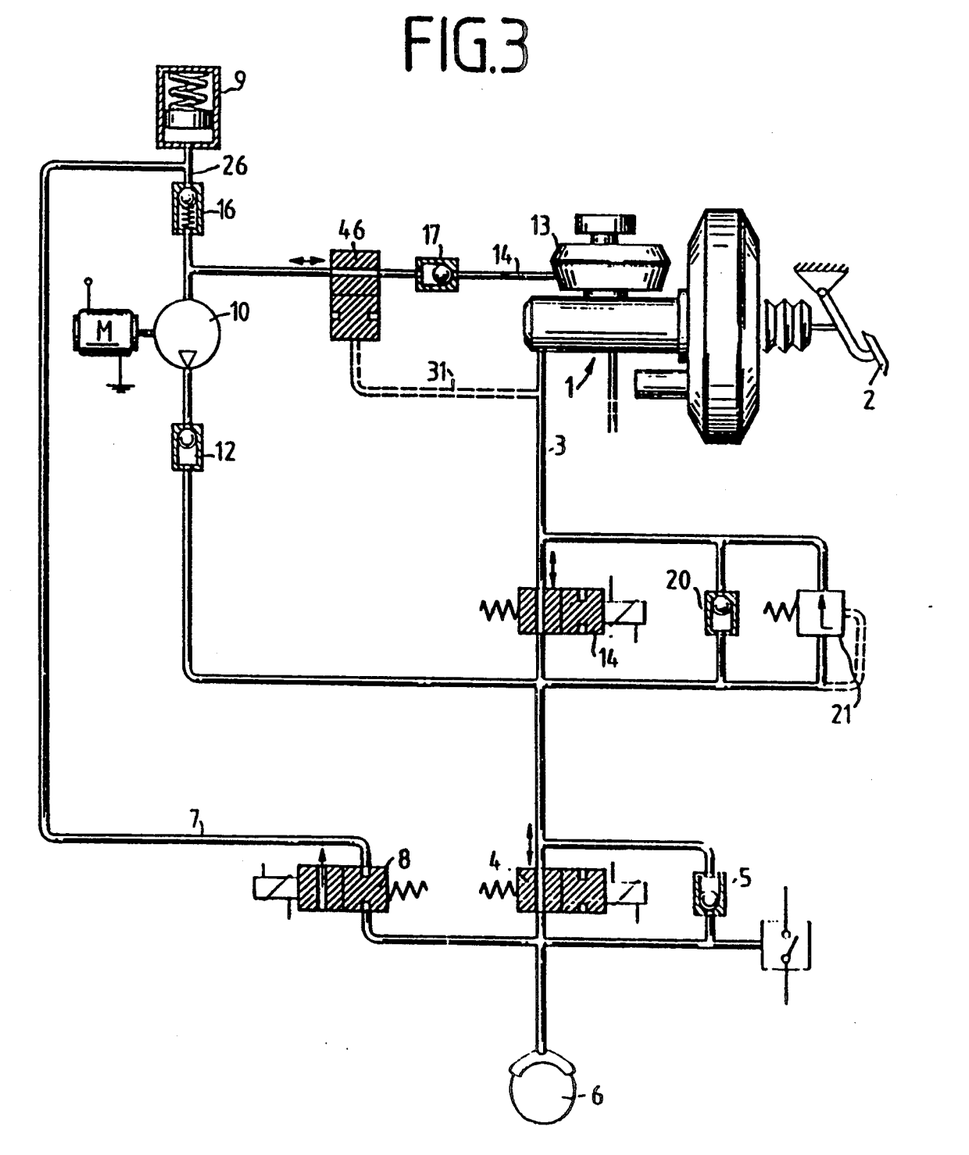
FIG. 3 is a schematic diagram of a third embodiment of the brake system of the present invention.
Figure 6:
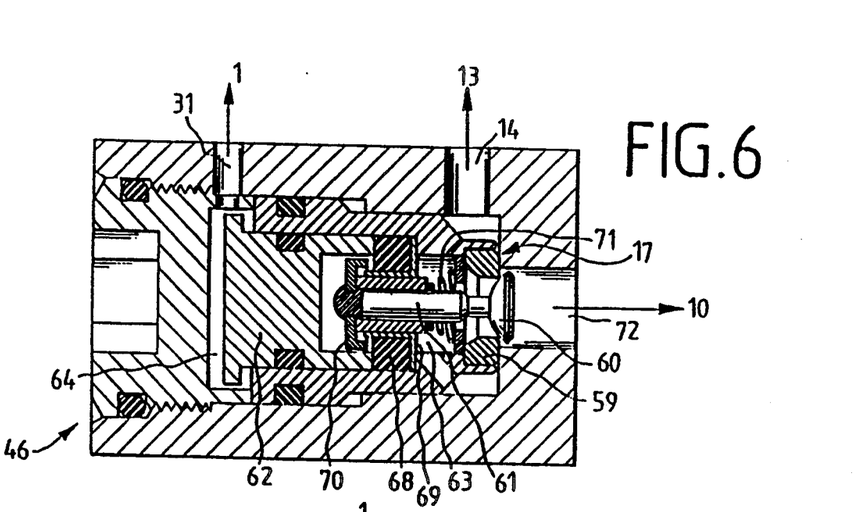
FIG. 6 is a partial cross-sectional view of a first valve used in the present invention.
Figure 7:
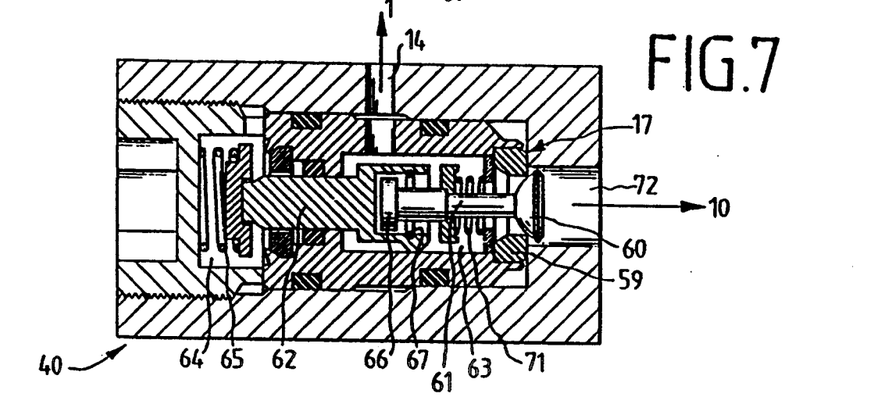
FIG. 7 is a partial cross-sectional view of a second valve used in the present invention.

Another variation of the present invention is shown in FIG. 3. In contrast to the previously described embodiments, the first non-return valve 16 is always arranged in the suction line 26. The connecting line 14 leading to the supply reservoir 13 terminates directly at the suction side of the pump 10, that is between the first non-return valve 16 and the pump 10. The connecting line 14 may thus terminate directly into the supply reservoir 13 (as is illustrated) or into the master brake cylinder 1 (corresponding to FIG. 2). Connected in the connecting line 14 is a closing valve 46 with two switch positions, the first non-return valve 17 being operative in a first switch position, while the connecting line 14 is closed in a second switch position. Possible embodiments of this valve are shown in FIGS. 6 and 7 and explained further below. According to FIG. 3, the closing valve 46 is actuated via a control line 31 which branches off from the master brake cylinder 1. As long as pressure prevails in the master brake cylinder, the connecting line 14 is closed and the brake system is a closed-loop system. In the event of a traction slip control operation, that means when the master brake cylinder 1 is unpressurized, the connecting line 14 passes fluid on one side, and the first non-return valve 17 is operative.

The embodiment according to FIG. 3 corresponds to the previous brake systems in all other respects.

Figure 5:
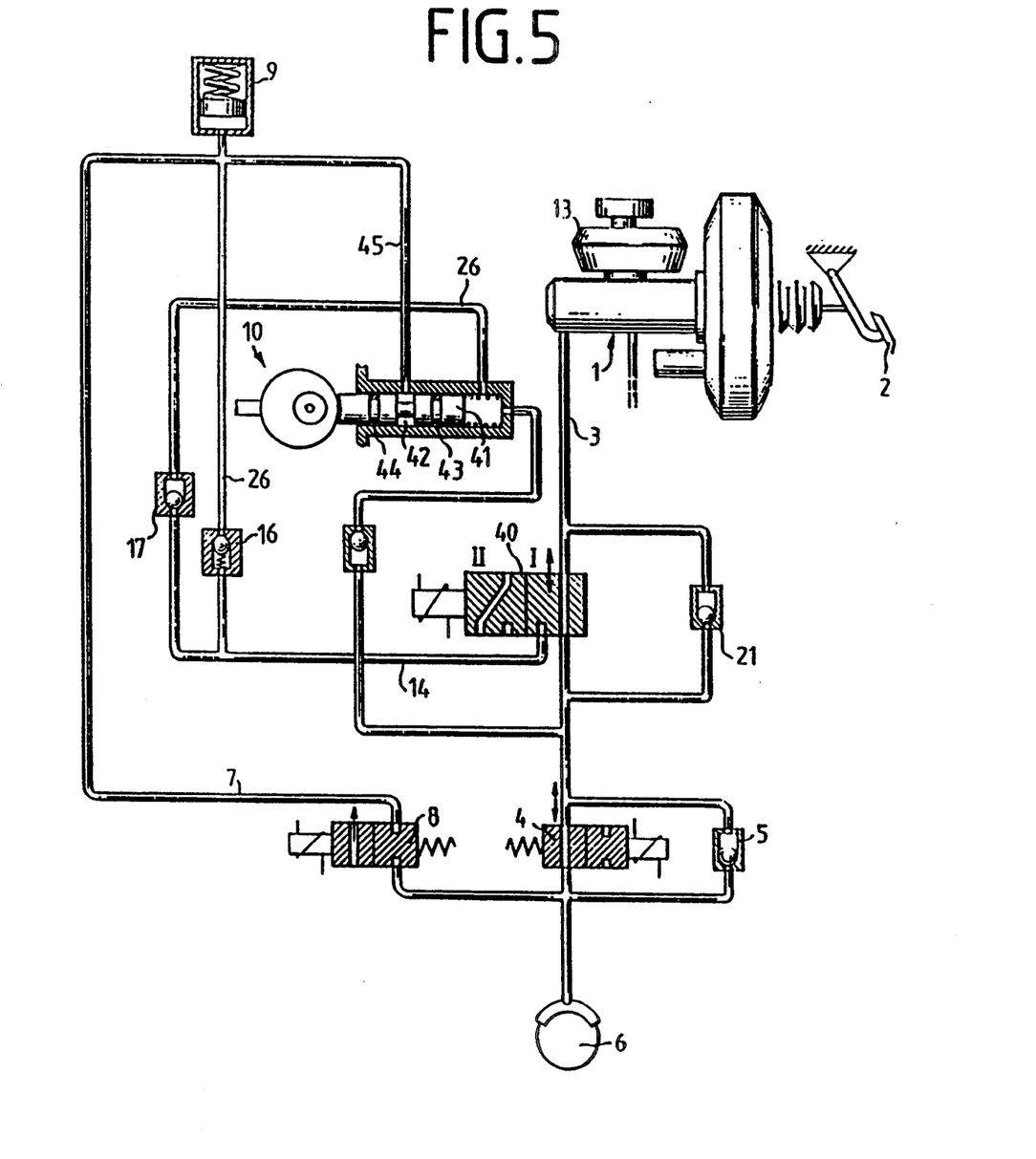
FIG. 5 is a schematic diagram of a fifth embodiment of the brake system of the present invention.

The closing valve 46 can be represented by a solenoid valve which, if need be, is combined with the separating valve 19 (see FIG. 5, valve 40).

Figure 4:
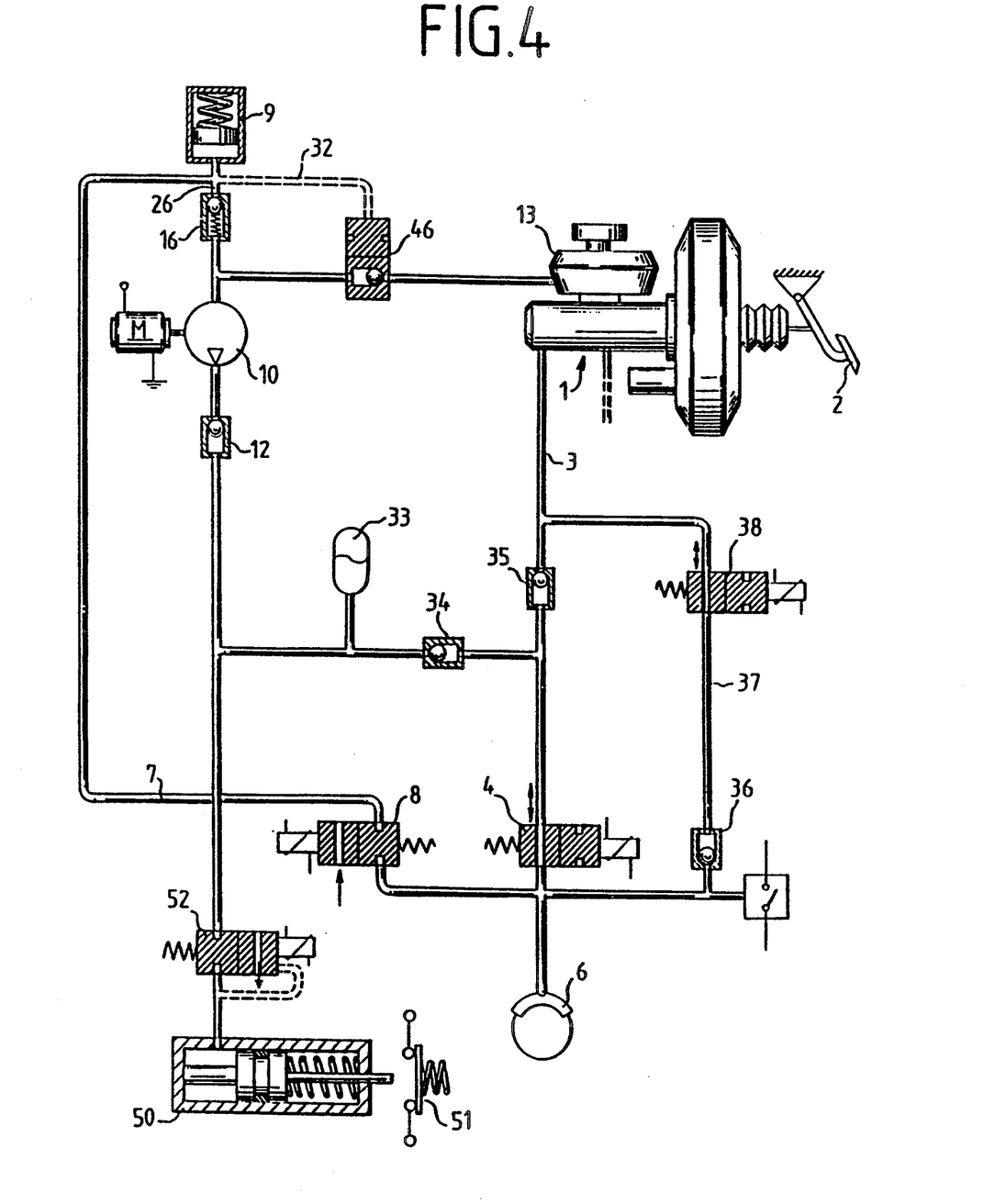
FIG. 4 is a schematic diagram of a fourth embodiment of the brake system of the present invention.

According to the embodiment of FIG. 4, the closing valve is operated by the pressure in the low-pressure accumulator 9. A control line 32 is provided to this end. It would also be possible to provide for a travel-responsive actuation by means of the piston of the low-pressure accumulator 9.

The embodiments described so far are arranged so that the pump 10 returns fluid into the master brake cylinder 1. The result is that the brake pedal changes its position during a brake slip control operation. To prevent this, another valve configuration is illustrated in the FIG. 4 embodiment which also can be employed in the embodiments according to FIGS. 1 to 3.

Thus, the pump 10 delivers fluid into a high-pressure accumulator 33 connecting via a non-return valve 34 to the brake line. The latter, in turn, is furnished with another non-return valve 35 which closes the accumulator in relation to the master brake cylinder 1.

To permit pressure reduction to take place in the wheel brake when the pedal is released, a shunt line 37 leading to the inlet valve and to the non-return valve 35 is provided into which a non-return valve 36 opening towards the master brake cylinder 1 is inserted. Pressure build-up takes place through the non-return valve 35 in the brake line, while pressure reduction is effected through the non-return valve 36 in the shunt line 37. In respect of its function, the separating valve 38 corresponds to the separating valve 19 according to FIGS. 1 to 3. It is inserted into the shunt line 37.

As soon as a traction slip control operation becomes necessary, the separating valve 38 will switch over and close the shunt line. This allows pressure build-up in the wheel brake since the master brake cylinder is isolated from the wheel brake by means of the non-return valve 35 and the closed separating valve 38.

To safeguard a rapid pressure build-up in the pressure line 11 in the event of a traction slip control operation (TSC), an additional accumulator TSC-accumulator 50 can be provided. The latter is connected to the pressure line via a change-over valve 52. The accumulator is kept in a constantly charged condition, its charging degree being monitored by means of a switch 51. The change-over valve will be opened in the TSC-mode so that the contents of the accumulator are fed into the brake circuit.

The design of the system of FIG. 5 is largely identical with the design of the systems according to FIGS. 1 to 4. The master brake cylinder 1 is in communication with the wheel brake 6 via a brake line 3. An inlet valve 4 is inserted into the brake line. The wheel brake 6 is in communication with the low-pressure accumulator 9 via a return line 7 into which an outlet valve 8 is inserted. The self-priming pump 10, illustrated herein in detail with an eccentric and a pump piston 41, delivers fluid via a pressure line 11 and a pressure valve 12 into the brake line 3 upstream of the inlet valve 4. The pump communicates via a suction line 26 with the low-pressure accumulator 9. Emanating from the pump 10, the suction line 26 first comprises the second non-return valve 17, while the first non-return valve 16 is interposed between the second non-return valve and the low-pressure accumulator. As explained, the first non-return valve has an opening pressure exceeding the atmospheric pressure.

The connecting line 14 branches off from the suction line 26, namely between the two non-return valves 16 and 17. The suction line 26 leads to a change-over valve 5 which is inserted into the brake line 3. In the first switch position of the change-over valve, the brake line is open and the connecting line 14 is closed, while in the second switch position of the change-over valve 40, the wheel brake is uncoupled from the master brake cylinder 1 and the connecting line 14 connects to the master brake cylinder 1 and, thus, if the pedal 2 is not actuated, to the supply reservoir 13. Connected in parallel to the change-over valve 40 is a pressure-relief valve 21 which interconnects the brake line branches upstream and downstream of the change-over valve 40.

Further, the piston 41 of the pump 10 has a special feature. An annular groove 42 is designed in its mid-portion which is sealed towards the pump chamber by a first seal 43 and towards the atmosphere by a second seal 44. The annular groove is in constant communication with the low-pressure accumulator 9 via a safety line 45.

During a braking operation without slip control, a connection is established between the master brake cylinder 1 and the wheel brake, namely via the change-over valve 40 which is in its first switch position and via the open inlet valve 4.

During a brake slip control operation, the pump drive is activated and the inlet and outlet valves will be operated. The change-over valve 40 remains in its first switch position. Since the connecting line 14 is closed, the pump 10 delivers fluid merely out of the low-pressure accumulator 9. Once the pressure in the wheel brake reduces to the atmospheric pressure, that is when no more brake force is exerted, the pump is no longer in a position to take in fluid through the first valve.

The change-over valve 40 is switched during a traction slip control operation so that its second switch position is activated. The suction side of the pump communicates via the second non-return valve 17 and the non-switched valve 40 with the pressure-fluid supply reservoir 13 and can now aspirate pressure fluid via the second valve.

The double sealing of the pump piston 41 diminishes the risk that air enters into the system in case a vacuum forms in the pump.

Three valves are illustrated in FIGS. 6 to 8 which represent possible embodiments for the schematically indicated valves in the valve switching arrangements of the FIGS. 1 to 5.

FIGS. 6 and 7 concern the closing valve 46 according to FIG. 3, with FIG. 6 illustrating a valve wherein the connecting line 14 terminates directly into the pressure-fluid supply reservoir and FIG. 7 illustrating a valve wherein the connecting line 14 terminates into the master brake cylinder.

The valves of FIGS. 6 and 7 are of largely identical design.

The non-return valve 17 is composed of a valve seat 59 and a valve member 60. Formed on the valve member is a shaft 61 which cooperates with a piston 62 through a lost-motion clutch. The piston 62 is sealingly guided in a bore and isolates the inlet chamber 63 from a control chamber 64. The connection between the inlet chamber 63 and the pump port 72 is governed by the non-return valve 17.

According to the embodiment in FIG. 6, the inlet chamber 63 is in communication with the supply reservoir 13, and the control chamber 64 is in communication with the master brake cylinder 1.

According to the embodiment in FIG. 7, the inlet chamber 63 is in communication with the master brake cylinder, while the control chamber 64 is always unpressurized and receives a control spring 65 supported on the piston 62.

The coupling device according to FIG. 7 includes of a collar 66 on the shaft 61 which cooperates with a stop ring 67 on the piston 62.

The coupling device according to FIG. 6 is composed of a rubber ring 68 which, in its outer region, is adapted to be clamped in between an annular surface on the piston 62 and a stop surface 69. The inner region of the rubber ring 68 cooperates with a collar 70 on the valve shaft 61.

The arrangement according to FIG. 6 operates as follows:

In the absence of pressure build-up in the control chamber 64, the valve is in its illustrated position. A clearance remains between the collar 70 and the rubber ring 68 which permits the valve member 60 to lift from the valve seat 59. The valve spring 71 dictates the opening pressure of the non-return valve 17. The pump can now aspirate fluid through the pump port 72 out of the inlet chamber 63 connected to the supply reservoir 13.

As soon as the master cylinder pressure is applied to the control chamber 64, the piston 62 will be pressed on the rubber ring 68 which deflects under the action of the force and such that the inner region of the ring bulges and moves into abutment on the collar 70. This keeps the valve member 60 in its closed position and the valve member cannot be moved to assume the open position. The non-return valve 17 is closed.

The arrangement according to FIG. 7 operates as follows:

The piston 62 is retained in the illustrated position by the action of the force of spring 65. The valve member 60 of non-return valve 17 can move freely so that the pump 10 can aspirate via the portion 72 out of the inlet chamber 63 which connects to the master brake cylinder 1. As soon as pressure is built up in the master brake cylinder, this pressure will become active in the inlet chamber 63, too, so that the piston 62 is displaced in opposition to the force of the control spring 65 and the stop ring 67 is moved to abut on collar 66. The valve 17 is now no longer able to open.

The valve according to FIG. 8 serves as a suction valve according to FIG. 1. The valve seat 80 is arranged on a movable sleeve 81 confining a control chamber 82 which connects to the master brake cylinder 1. The sleeve 81 displaces under the effect of the pressure in the control chamber 82 in opposition to the force of a resetting spring 85. During this movement, simultaneously, the valve spring 84 supported on the valve ball is compressed so that its biasing force is augmented.

When sleeve 81 is in its illustrated position, the biasing force of the spring 84 is approximately 0.2 bar. Thus, the valve acts as second non-return valve 17. When sleeve 81 is displaced downwardly in the drawing under the action of the braking pressure, the biasing force of the spring 84 will be increased to somewhat higher than 1 bar so that the valve acts as first non-return valve 16.

Figure 9:
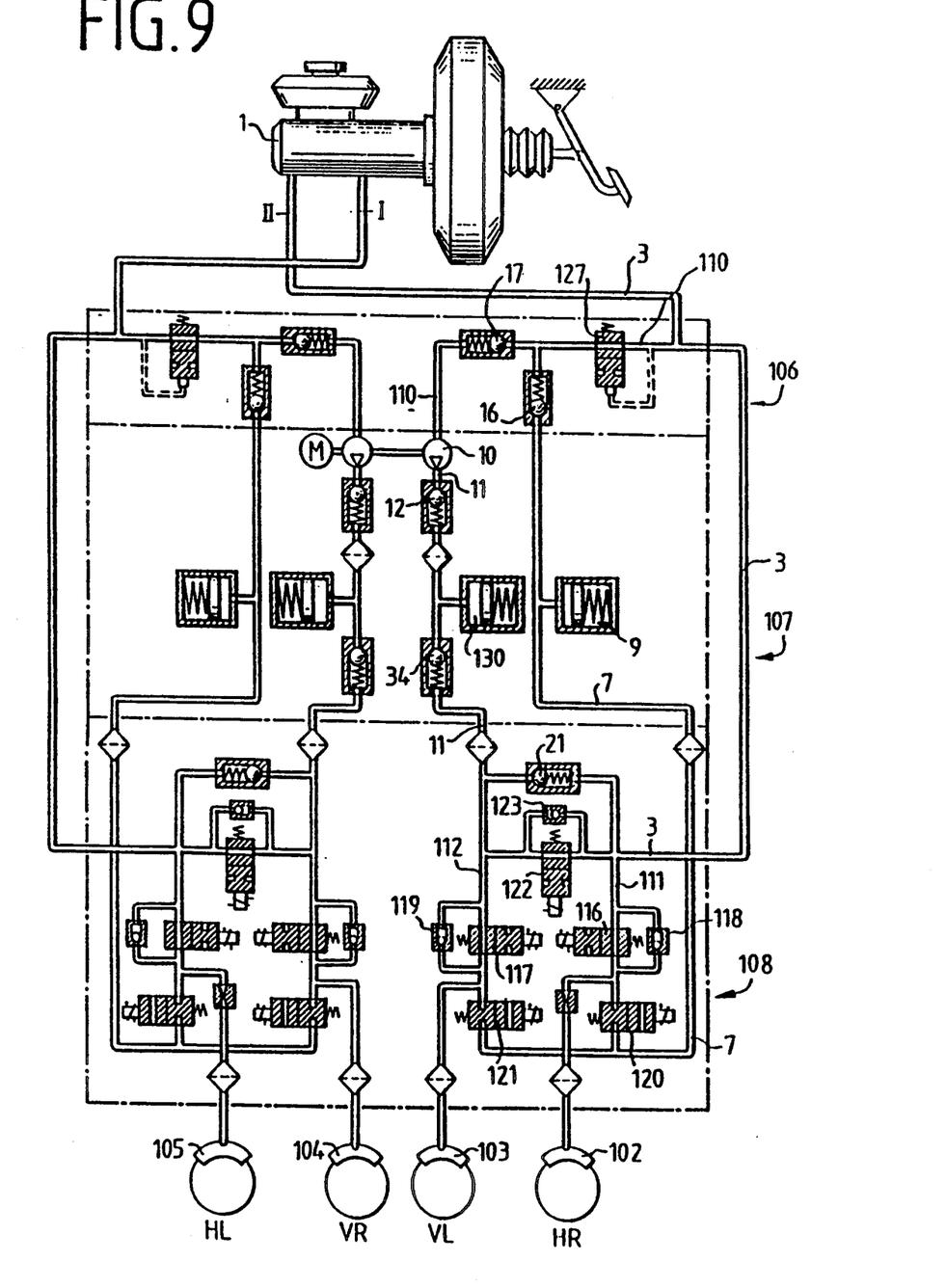
FIG. 9 is a schematic diagram of a sixth embodiment of the brake system of the present invention.

The brake system shown in FIG. 9 comprises two brake circuits I and II with diagonal allotment of the wheel brakes for a vehicle with front-axle drive. The two brake circuits I and II have a completely analogous design so that the following description of one brake circuit applies to the other one as well.

The hydraulic function elements required for slip control between the master brake cylinder 1 and the wheel brakes 102, 103, 104 and 105 are arranged in three housing units 106, 107 and 108 which are shown in dot-dash lines in the drawing.

The brake line 3 extends from the master brake cylinder 1 to the TSC-adapter 106 in which the low-pressure line 110 is connected to the brake line 3. The brake line 3 leads outside of the housing units 106, 107 and 108 to the valve block 108 where it is in communication with the wheel brakes 102 and 103 via the branch lines 111 and 112. The return line 7 extends from these through the valve block 108 and the pump unit 107 to the TSC-adapter 106 where it terminates into the low-pressure line 110. The low-pressure line 110 extends from its connection to the brake line 3 through the TSC-adapter 106 in the pump unit 107 to the suction side of the self-priming pump 10 delivering fluid into the pressure line 11. The pressure line 11 leads from the pump 10 into the valve block 108 where it terminates into the brake line 3.

Inserted in the branch line 111 from the brake line 3 to the right-hand rear-wheel brake 102 as well as in the branch line 112 from the brake line 3 to the left-hand front-wheel brake 103 are electromagnetically operated inlet valves 116 and 117, respectively, open in their de-energized state and having parallel connected non-return valves 118 and 119, respectively, the non-return valves preventing pressure locking in the wheel brakes 102 and 103. In order to isolate in the event of brake slip control the brake 102 of the rear non-driven axle from the brake 103 of the front driven axle, an electromagnetically operated separating valve 122, open in its de-energized state, is inserted into the brake line 3 between the connections of the branch lines 111 and 112, while a parallel connected non-return valve 123 permits pedal-operated braking even when the separating valve 122 is closed.

Arranged between the wheel brakes 102 and 103 and the return line 7 are electromagnetically operated outlet valves 120 and 121, respectively, which are closed in their de-energized state. The return line comprises in the pump unit 107 a connection to the low-pressure accumulator 9 and comprises in the TSC-adapter 106 the second non-return valve 16, the initial pressure of which is 1.3 bar. In contrast thereto, the first non-return valve 17, which is arranged in the TSC-adapter 106 in the low-pressure line 110 between the suction side of the pump 10 and the suction side of the port of the return line 7, opens in the presence of a pressure difference of 0.2 bar. Principally, the sum of the initial pressures of the two non-return valves 16 and 17 should always be above the atmospheric pressure in order to prevent that a pressure below atmospheric pressure is caused in the wheel brakes when the outlet valves 120 and 121 are open.

Between the port of the return line 7 and the connection of the low-pressure line 110 to the brake line 3, a hydraulic two-way/two-position directional control valve 127 is provided in the TSC-adapter 106 in the low-pressure line 110. Valve 127 is open in its initial position and closable by the master brake cylinder pressure and can also be replaced by a solenoid valve.

In the pressure line, two pressure valves 12 and 34 are connected downstream of the pump 10 in the pump unit 107, between which valves the damping accumulator 130 is arranged which absorbs pressure impacts. The initial pressure of the first pressure valve 12 amounts to roughly 10 bar, while that of the second pressure valve 34 amounts to roughly 0.2 bar.

Finally, the pressure line 11 in the valve block is connected via the pressure-relief valve 21 to the brake line 3. The initial pressure of this pressure-relief valve 21 lies far beyond the maximally provided braking pressure and serves as a mere safety arrangement to relieve the pressure line 11 in case the pump builds up too high of a pressure when the separating valve 122 is closed.

The mode of function of the brake system is as follows:

During normal braking the pressure developed in the master cylinder 1 propagates through the brake line 3 into the branch line 111 and via the separating valve 122 into the branch line 112, as well as via the inlet valves 116 and 117 into the cylinders of the wheel brakes 102 and 103. The pressure in the brake line 3 causes the hydraulic two-way/two-position directional control valve 127 to close. The pressure in the wheel cylinders decreases through the same way upon termination of brake application.

When the braked wheel tends to lock during a brake operation, the corresponding inlet valve 116 or 117 closes for a short time, the associated outlet valve 120 or 121 opens, and the pressure escapes out of the wheel cylinder through the return line 7 into the low-pressure accumulator 9. The pump 11 delivers the pressure fluid out of the low-pressure accumulator 9 via the non-return valves 16 and 17 through the pressure line 11 into the wheel brakes 102 and 103. The pump pressure is governed by the master brake cylinder pressure. The separating valve 122 remains constantly open during these actions.

Pressure from the master brake cylinder 1 does not prevail in a traction slip control phase so that the two-way/two-position directional control valve 127 remains open. The pump 11 draws fluid from the master brake cylinder 1 and delivers it into the pressure line 11. The separating valve 122 will be closed so that pressure develops only in the wheel brake 103 of the driven front wheel.

Upon termination of the traction slip control operation, the pump 115 stops its delivery, and the separating valve 122 as well as possibly the outlet valve 121 will be opened so that the pressure fluid can flow back into the master brake cylinder 1.

LIST OF REFERENCES 1 master brake cylinder
2 pedal
3 brake line
4 inlet valve
5 non-return valve
6 wheel brake
7 return line
8 outlet valve
9 low-pressure accumulator
10 pump
11 pressure line
12 pressure valve
13 pressure-fluid supply reservoir 14 connecting line
15 suction valve
16 first non-return valve
17 second non-return valve
18 control line
19 separating valve
20 non-return valve
21 pressure-relief valve
22 non-return valve
23 closing valve
24 first control line
25 second control line
26 suction line
31 control line
32 control line
33 high-pressure accumulator
34 non-return valve
35 non-return valve
36 non-return valve
37 shunt line
38 separating valve
40 change-over valve
41 pump piston
42 annular groove
43 seal
44 seal
45 safety line
46 closing valve
50 TSC-accumulator
51 switch
52 connecting valve
59 valve seat
60 valve member
61 shaft
62 piston
63 inlet chamber
64 control chamber
65 control spring
66 collar
67 stop ring
68 rubber ring
69 stop surface
70 collar
71 valve spring
72 pump port
80 valve seat
81 sleeve
82 control chamber
83 valve ball
84 valve spring
85 resetting spring
102 wheel brake
103 wheel brake
104 wheel brake
105 wheel brake
106 TSC-adapter
107 pump unit
108 valve block
110 low-pressure line
111 branch line
112 branch line
116 inlet valve
117 inlet valve
118 non-return valve
119 non-return valve
120 outlet valve
121 outlet valve
122 separating valve
123 non-return valve
127 two-way/two-position directional control valve
130 damping accumulator

What is claimed:

1. A brake system for controlling fluid pressure in a wheel brake during normal braking, brake slip control and traction slip control, said brake system comprising:
 a wheel brake;
 a brake pedal;
 a pressure fluid reservoir containing a pressure fluid;
 a master brake cylinder in fluid communication with said pressure fluid reservoir and responsive to movement of said brake pedal for developing a pressure build up of pressure fluid in said master brake cylinder in response to actuation of said brake pedal;
 an auxiliary source of pressure fluid containing pressure fluid having an initial pressure greater than atmospheric pressure;
 a pump;
 first control means extending between said master brake cylinder and said wheel brake:
  (a) for controlling pressure fluid flow from and to said master brake cylinder,
  (b) for permitting pressure fluid flow between said master brake cylinder and said wheel brake during normal braking as said brake pedal is actuated and without sensing a tendency of wheel lock,
  (c) for regulating pressure fluid flow to said wheel brake during brake slip control as a tendency of wheel lock is sensed, and
  (d) for preventing pressure fluid flow through said first control means to said master brake cylinder during traction slip control as wheel slippage is sensed;
 second control means extending between said pump and said pressure fluid reservoir, and said pump and said auxiliary source of pressure fluid:
  (a) for preventing pressure fluid flow between said pressure fluid reservoir and said pump during normal braking and brake slip control,
  (b) for permitting pressure fluid flow between said pressure fluid reservoir and said pump during traction slip control,
  (c) for causing a first valve, having a first valve opening pressure less than said initial pressure of said auxiliary source of pressure fluid and in excess of atmospheric pressure, to resist pressure fluid flow from said auxiliary source of pressure fluid to said pump:
   (i) when pressure fluid flow between said master brake cylinder and said wheel brake is permitted during normal braking, and
   (ii) when pressure fluid flow between said master brake cylinder and said wheel brake is regulated during brake slip control, and
  (d) for causing a second valve, having a second valve opening pressure less than said first valve opening pressure, to resist pressure fluid flow from said pressure fluid reservoir to said pump in the absence of pressure fluid flow from said master brake cylinder to said first control means when said brake pedal is not actuated during traction slip control; and
 third control means extending between said pump and said first control means for conducting pressure fluid flow from said pump to said first control means during brake slip control and traction slip control.

2. A brake system as claimed in accordance with claim 1 wherein said second control means include:
   a suction line, extending between said auxiliary source of pressure fluid and said pump for conducting pressure fluid; and
   a suction valve, positioned in said suction line and responsive to pressure fluid flow in said first control means, comprising said first valve and said second valve and having:
   (a) a first switch position wherein said first valve is inserted in said suction line:
      (i) when pressure fluid flow between said master brake cylinder and said wheel brake is permitted during normal braking, and
      (ii) when pressure fluid flow between said master brake cylinder and said wheel brake is regulated during brake slip control, and
   (b) a second switch position wherein said second valve is inserted in said suction line in the absence of pressure fluid flow from said master brake cylinder to said first control means when said brake pedal is not actuated during traction slip control.

3. A brake system as claimed in accordance with claim 2 wherein:
   said third control means include a first non-return valve and a second non-return valve for preventing pressure fluid flow from said first control means to said pump; and
   said second control means further include:
   (a) a control valve positioned between said master brake cylinder and said auxiliary source of pressure fluid, said control valve having:
      (i) a first position for permitting pressure fluid flow between said master brake cylinder and said auxiliary source of pressure fluid, and
      (ii) a second position for preventing pressure fluid flow between said master brake cylinder and said auxiliary source of pressure fluid,
   (b) a first control line in fluid communication with said third control means at a point between said first and said second non-return valves for switching said control valve to said first position when fluid pressure at said point appreciably exceeds fluid pressure of said master brake cylinder, and
   (c) a second control line in fluid communication with said master brake cylinder for switching said control valve to said second position when fluid pressure at said point does not appreciably exceed fluid pressure of said master brake cylinder.

4. A brake system as claimed in accordance with claim 1 wherein said second control means include:
   (a) a suction line, extending between said auxiliary source of pressure fluid and said pump for conducting pressure fluid, and in which said first valve is inserted for preventing pressure fluid flow from said pump to said auxiliary source of pressure fluid,
   (b) a connecting line, extending between said pressure fluid reservoir and said pump, for conducting pressure fluid, and in which said second valve is inserted for preventing pressure fluid flow from said pump to said auxiliary source of pressure fluid,
   (c) a control valve, inserted in said connecting line between said second valve and said pump and having:
      (i) a first position for preventing pressure fluid flow between said pressure fluid reservoir and said pump,
      (ii) a second position for permitting pressure fluid flow from said pressure fluid reservoir to said pump, and
      (iii) valve switch control means for switching said control valve to said first position during normal braking and brake slip control and for switching said control valve to said second position during traction slip control.

5. A brake system as claimed in accordance with claim 4 wherein said valve switch control means are responsive to pressure fluid flow from said auxiliary source of pressure fluid for switching said control valve to said first position.

6. A brake system as claimed in accordance with claim 4 wherein said valve switch control means are responsive to pressure fluid flow from said first control means for switching said control valve to said first position.

7. A brake system as claimed in accordance with claim 1 wherein said second control means include:
   (a) a suction line, extending between said auxiliary source of pressure fluid and said pump for conducting pressure fluid, and in which said first valve is inserted for preventing pressure fluid flow from said pump to said auxiliary source of pressure fluid,
   (b) a connecting line, extending between said pressure fluid reservoir and said pump, for conducting pressure fluid, and
   (c) a control valve, inserted in said connecting line, comprising said second valve and having:
      (i) a first position for preventing pressure fluid flow between said pressure fluid reservoir and said pump,
      (ii) a second position, wherein said second valve is inserted in said connecting line for preventing pressure fluid flow from said pump to said pressure fluid reservoir and for permitting pressure fluid flow from said pressure fluid reservoir to said pump when the pressure of said pressure fluid reservoir exceeds the pressure of said pump by greater than an opening pressure of less than atmospheric, and
      (iii) valve switch control means for switching said control valve to said first position during normal braking and brake slip control and for switching said control valve to said second position during traction slip control.

8. A brake system as claimed in accordance with claim 7 wherein said valve switch control means are responsive to pressure fluid flow from said auxiliary source of pressure fluid for switching said control valve to said first position.

9. A brake system as claimed in accordance with claim 1 wherein:
   (a) said first control means include a brake line extending between said master brake cylinder and said wheel brake for conducting pressure fluid; and
   (b) said second control means include a suction line, extending between said auxiliary source of pressure fluid and said pump for conducting pressure fluid, wherein:

(i) said first valve is inserted in said suction line adjacent said auxiliary source of pressure fluid for preventing pressure fluid flow from said pump to said auxiliary source of pressure fluid, and (ii) said second valve is inserted in said suction line adjacent said pump for preventing pressure fluid flow from said pump and for allowing pressure fluid flow to said pump only when the pressure of said pressure fluid flow to said pump exceeds an opening pressure which is less than atmospheric, and said brake system further includes an electromagnetically switchable control valve inserted in said second control means and in said brake line and having:

(i) a first position for permitting pressure fluid flow between said master brake cylinder and said wheel brake and for preventing pressure fluid flow between said master brake cylinder and said pump during normal braking and brake slip control, and (ii) a second position for preventing pressure fluid flow between said master brake cylinder and said wheel brake and for permitting pressure fluid flow between said master brake cylinder and said pump during traction slip control.

10. A brake system for controlling fluid pressure in a wheel brake during normal braking, brake slip control and traction slip control, said brake system comprising:
 a wheel brake;
 a brake pedal;
 a pressure fluid reservoir containing a pressure fluid;
 a master brake cylinder in fluid communication with said pressure fluid reservoir and responsive to movement of said brake pedal for developing a pressure build up of pressure fluid in said master brake cylinder in response to actuation of said brake pedal;
 an auxiliary source of pressure fluid containing pressure fluid having an initial pressure greater than atmospheric pressure;
 a pump;
 first control means extending between said master brake cylinder and said wheel brake:
  (a) for controlling pressure fluid flow from and to said master brake cylinder,
  (b) for permitting pressure fluid flow between said master brake cylinder and said wheel brake during normal braking as said brake pedal is actuated and without sensing a tendency of wheel lock,
  (c) for regulating pressure fluid flow to said wheel brake during brake slip control as a tendency of wheel lock is sensed, and
  (d) for preventing pressure fluid flow through said first control means to said master brake cylinder during traction slip control as wheel slippage is sensed;
 second control means extending between said auxiliary source of pressure fluid and said pump:
  (a) for preventing pressure fluid flow from said pump to said auxiliary source of pressure fluid and
  (b) for permitting pressure fluid flow from said auxiliary source of pressure fluid to said pump when the fluid pressure at said auxiliary source of pressure fluid exceeds the fluid pressure at said pump by at least a first opening pressure, which is less than said initial pressure of said auxiliary source of pressure and in excess of atmospheric pressure third control means extending between said pressure fluid reservoir and said pump for controlling fluid flow between said pressure fluid reservoir and said pump:
  (a) to prevent pressure fluid flow between said pressure fluid reservoir and said pump during normal braking and brake slip control, and
  (b) to permit pressure fluid flow from said pressure fluid reservoir to said pump during traction slip control when the fluid pressure at said pressure fluid reservoir exceeds the fluid pressure at said pump by at least a second opening pressure, which is less than atmospheric pressure; and
 fourth control means extending between said pump and said first control means for conducting pressure fluid from said pump to said first control means during brake slip control and traction slip control.

11. A brake system in accordance with claim 10 wherein said first control means include:
 a brake line extending between said master brake cylinder and said wheel brake for conducting pressure fluid, wherein said fourth control means intersects said first control means at a junction on said brake line;
 a control line extending between said master brake cylinder and said wheel brake in parallel to said brake line for conducting pressure fluid;
 a first non-return valve, inserted in said brake line between said master brake cylinder and said junction for preventing pressure fluid flow to said master brake cylinder through said brake line;
 a second non-return valve, inserted in said control line for preventing pressure fluid flow to said wheel brake through said control line;
 a first electromagnetically actuatable control valve, inserted in said brake line between said wheel brake and said junction, having:
  (a) a first switch position for permitting pressure fluid flow between said wheel brake and said junction and
  (b) a second switch position for preventing pressure fluid flow between said wheel brake and said junction and
 a second electromagnetically actuatable control valve, inserted in said control line between said master brake cylinder and said second non-return valve, having:
  (a) a first switch position for permitting pressure fluid flow between said master brake cylinder and said second non-return valve and
  (b) a second switch position for preventing pressure fluid flow between said master brake cylinder and said second non-return valve,
 wherein said first and said second electromagnetically actuatable control valves are responsive to brake pedal position and are selectively opened and closed during brake slip control to maintain the brake pedal position at commencement of brake slip control.

12. A brake system in accordance with claim 10 wherein said pump is a reciprocating piston pump having piston having a sealed annular groove in constant fluid communication with said auxiliary source of pressure fluid.

13. A brake system for controlling fluid pressure in a plurality of wheel brakes during normal braking, brake slip control and traction slip control, said brake system comprising:

a plurality of driven wheel brakes;
a plurality of non-driven wheel brakes;
a brake pedal;
a pressure fluid reservoir containing a pressure fluid;
a master brake cylinder in fluid communication with said pressure fluid reservoir and responsive to movement of said brake pedal for developing a pressure build up of pressure fluid in said master brake cylinder in response to actuation of said brake pedal; and
two identical brake circuits, each associated with a driven wheel and a non driven wheel and each comprising:
  (a) a pump
  (b) an auxiliary source of pressure fluid containing pressure fluid having an initial pressure greater than atmospheric pressure;
  (c) driven wheel first control means extending between said master brake cylinder and a driven wheel brake:
    (i) for controlling pressure fluid flow from and to said master brake cylinder,
    (ii) for permitting pressure fluid flow between said master brake cylinder and said driven wheel brake during normal braking, and
    (iii) for regulating pressure fluid flow between said master brake cylinder and said driven wheel brake during brake slip control and traction slip control;
  (d) non-driven wheel first control means extending between said master brake cylinder and a non-driven wheel brake:
    (i) for controlling pressure fluid flow from and to said master brake cylinder,
    (ii) for permitting pressure fluid flow between said master brake cylinder and said non-driven wheel brake during normal braking, and
    (iii) for regulating pressure fluid flow between said master brake cylinder and said non-driven wheel brake during brake slip control;
  (e) second control means extending between said pump and said pressure fluid reservoir, and said pump and said auxiliary source of pressure fluid:
    (i) for preventing pressure fluid flow between said pressure fluid reservoir and said pump during normal braking and brake slip control,
    (ii) for permitting pressure fluid flow between said pressure fluid reservoir and said pump during traction slip control,
    (iii) for causing a first valve, having a first valve opening pressure less than said initial pressure of said auxiliary source of pressure fluid and in excess of atmospheric pressure, to resist pressure fluid flow from said auxiliary source of pressure fluid to said pump when pressure fluid flow between said master brake cylinder and said wheel brake is permitted during normal braking, and when pressure fluid flow between said master brake cylinder and said wheel brake is regulated during brake slip control, and
    (iv) for causing a second valve, having a second valve opening pressure less than said first valve opening pressure, to resist pressure fluid flow from said pressure fluid reservoir to said pump in the absence of pressure fluid flow from said master brake cylinder to said first control means when said brake pedal is not actuated during traction slip control;
  (f) third control means extending between said pump and said driven wheel first control means for conducting pressure fluid flow from said pump to said driven wheel brake during brake slip control and traction slip control; and
  (g) fourth control means, extending between said driven wheel first control means and said non-driven wheel first control means:
    (i) for permitting pressure fluid flow between said driven wheel first control means and said non-driven wheel first control means during normal braking and brake slip control;
    (ii) for preventing pressure fluid flow between said driven wheel first control means and said non-driven wheel first control means during traction slip control when the fluid pressure of said driven wheel first control means is less than a predetermined pressure, and
    (iii) for permitting pressure fluid flow between said driven wheel first control means and said non-driven wheel first control means during traction slip control when the fluid pressure of said driven wheel first control means exceeds said predetermined pressure.

* * * * *